(12) United States Patent
Ganev et al.

(10) Patent No.: US 7,459,889 B2
(45) Date of Patent: Dec. 2, 2008

(54) DC BUS SHORT CIRCUIT COMPLIANT POWER GENERATION SYSTEMS USING INDUCTION MACHINE

(75) Inventors: Evgeni Ganev, Torrance, CA (US); Leroy A. Fizer, Huntington Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 152 days.

(21) Appl. No.: 11/621,489

(22) Filed: Jan. 9, 2007

(65) Prior Publication Data

US 2008/0164851 A1 Jul. 10, 2008

(51) Int. Cl.
*F02N 11/04* (2006.01)

(52) U.S. Cl. .......................................... 322/37; 322/59

(58) Field of Classification Search .................. 322/22, 322/23, 37, 47, 59, 99
See application file for complete search history.

(56) References Cited

U.S. PATENT DOCUMENTS

| | | | | |
|---|---|---|---|---|
| 4,473,752 A | | 9/1984 | Cronin | |
| 5,189,357 A | * | 2/1993 | Woodson et al. | 318/737 |
| 5,281,905 A | * | 1/1994 | Dhyanchand et al. | 322/32 |
| 5,363,032 A | * | 11/1994 | Hanson et al. | 322/10 |
| 5,428,275 A | * | 6/1995 | Carr et al. | 318/146 |
| 5,430,362 A | * | 7/1995 | Carr et al. | 318/779 |
| 5,493,201 A | * | 2/1996 | Baker | 322/10 |
| 5,512,811 A | * | 4/1996 | Latos et al. | 322/10 |
| 5,587,647 A | * | 12/1996 | Bansal et al. | 322/45 |
| 5,594,322 A | * | 1/1997 | Rozman et al. | 322/10 |
| 6,462,429 B1 | * | 10/2002 | Dhyanchand et al. | 290/31 |
| 6,768,284 B2 | | 7/2004 | Lee et al. | |
| 6,870,337 B2 | | 3/2005 | Peterson | |
| 6,998,726 B2 | * | 2/2006 | Sarlioglu et al. | 290/31 |
| 7,122,994 B2 | * | 10/2006 | Anghel et al. | 322/60 |
| 7,227,271 B2 | * | 6/2007 | Anghel et al. | 290/31 |

* cited by examiner

*Primary Examiner*—Nicholas Ponomarenko
(74) *Attorney, Agent, or Firm*—Oral Caglar, Esq.

(57) ABSTRACT

Conventional electric power generation system employ a solid state electronically controlled IM that may be capable of self-start motoring and power generation, but, when the DC bus voltage collapses upon a failure, an additional external source of DC voltage is not available for IM excitation. The present invention provides an internal bus that does not collapse when the main DC bus is shorted. This internal or auxiliary bus may be used to excite the IM to provide generation function. The power generation systems of the present invention may play a significant role in the modern aerospace and military industries.

20 Claims, 5 Drawing Sheets

DC BUS SHORT CIRCUIT COMPLIANT POWER GENERATION SYSTEMS USING INDUCTION MACHINE

BACKGROUND OF THE INVENTION

The present invention generally relates to a DC bus short circuit compliant power generation system, and more particularly, to a DC bus short circuit compliant power generation system having an internal bus that does not collapse when the main DC bus is shorted.

Power generation systems (PGS) play a significant role in the modern aerospace/military industry. Recently, this has been particularly true in the area of more electric architecture (MEA) for aircraft and spacecraft. The commercial aircraft business is moving toward a no-bleed air environmental control system (ECS), variable frequency (VF) power distribution systems, and electrical actuation. The next-generation Boeing airplane (the Boeing 787 platform) and the Airbus airplane will most likely use MEA. Some military aircraft already utilize MEA for primary and secondary flight control among other functions.

These new aerospace trends have significantly increased power generation needs. This has led to increased operating voltages to reduce system losses, weight, and volume, and a new set of power and electromagnetic interference (EMI) requirements has been created to satisfy both quality and performance. The overall result has been a significant increase in the installed electric power, creating challenges in accommodating this equipment in the new platforms. Therefore, overall system performance improvement and power density increases are necessary for the new generation hardware to satisfy MEA. The power generation systems' cost is an additional driver that needs improvement to make the new platforms affordable.

The high performance power generation system (HPPGS) applicable to MEA is required to satisfy a quite complex set of requirements. Generation is the main function of such a system, providing conversion of the mechanical power supplied by the prime mover to conditioned electrical power supplied to the distribution bus. Generation system rating is typically defined as continuous power at 100% load. Increasing the load to 150% for a limited time may be required. The percentage of increase and time required for overloading varies from application to application. Self-start is a motoring operation that provides engine startup. Systems use power supplied by an electric distribution bus, an electric auxiliary source, or a battery and create a predetermined startup profile for the prime mover. This function may last from several seconds to several minutes. An efficient startup function is typically challenging because of limited power availability. Motoring is a function that provides continuous motoring operation using an external electric power source for maintenance purposes. Different speeds may be required. Finally, short circuit current function is required when an external short circuit fault occurs at the DC distribution bus. The protection system uses it for clearing the fault. This current is slightly higher than the maximum operating current and is required for several seconds.

The synchronous permanent magnet machine (PMM) presents a very competitive design that outperforms other electric machines in most applications when weight and size are critical. However, the rotor flux in a typical PMM is fixed and cannot be controlled or disengaged when a short circuit is initiated. Unlike other machines where the excitation of the rotor flux can be controlled and even disabled quickly, a PMM continues to generate electromotive force (EMF) until the rotor stops rotating. Therefore, the PMM presents a hazard in some applications, leading to its limited use, particularly in the aerospace industry.

The high reactance permanent magnet machine (HRPMM) was conceived to internally limit the phase current magnitude, should it become shorted, to levels capable of being sustained either indefinitely, within the thermal limits of the system, or until the rotor speed can be reduced to zero.

This feature of the HRPMM makes the PMM-based PGS much safer. However there are applications where the fault currents must be discontinued instantly. This is possible only if electric machines with external rotor flux excitation are used. The most popular machine representatives are wound-field (WF), switch-reluctance machines (SRM), and induction machines (IM). Recent high-speed technological advancements make the IM a very strong candidate for this application. However a special provision is required when a DC bus short circuit is experienced and the generation system is supposed to deliver short circuit current to clear the fault protection circuit. The external source for the IM excitation is shorted. Therefore, an alternative is required to supply excitation for the IM rotor flux.

FIG. 1 shows a conventional simplified architecture of a power generation system 10 using an induction machine (IM) 12. The power generation system 10 may include a three-phase IM 12, a three-phase bridge 14 (D1 through D6 and Q1 through Q6), a DC link capacitor C1, an EMI filter 16, a main contactor 18, a battery contactor 20, and a control module 22.

The IM 12 may interface mechanically with a prime mover via direct coupling or a gearbox (not shown). The main function of the IM 12 is to convert electrical power to mechanical power when used for motoring and self-start modes of operation, and to convert mechanical power to electrical power when used as a generator. Various types of IM's 12 can be used. The most popular design is a three-phase winding 24 accommodated in the slots of a laminated tooth type stator (not shown).

The three-phase bridge 14 (D1 through D6 and Q1 through Q6) may operate as an inverter during motoring and self-start operation. The bridge 14 may create the required voltage at the IM terminals resulting in three-phase equally spaced currents required for machine control. In generating mode, the bridge 14 may operate as an exciter for the machine rotor flux while it acts as an active rectifier.

The DC link capacitor C1 may provide a low impedance source for the bridge 14 operating as a voltage source inverter. During generation, C1 may provide filtering of the rectified voltage.

The purpose of the EMI filter 16 is to provide adequate filtering for radiated and conducted emission to meet the respective requirements for electromagnetic compliance EMC. Also, the EMI filter 16 may protect the internal control circuits from external interference.

The main contactor 18 connects and disconnects the main bus (not shown) of the power generation system 10 when required for normal operation or emergency.

The battery contactor 20 connects and disconnects the battery bus (not shown) of the power generation system 10 when required for normal operation or emergency.

The control module 22 may receive control signals and send status signals to an external host computer (not shown). The control module 22 may also receive measured internal signals from the system, which is required for control and protection purposes such as currents, voltages, temperatures and status of contactors. The control system 22 may generate control signals to the actively controlled semiconductor and electromagnetic devices.

This power topology may provide generation, self-start and motoring modes of operation by using an appropriate control system as described above. However, supplying short circuit current to the DC bus when an external or internal fault occurs across the DC bus cannot be performed. The reason is lack of a supply source required for the bridge to excite IM.

As can be seen, there is a need for an apparatus for an improved family of IM-based power generation systems that can supply current to the bus in case of short circuit failure.

SUMMARY OF THE INVENTION

In one aspect of the present invention, a power generation system comprises an induction machine; a first induction machine winding; a second machine winding; an excitation bridge electrically connected to the second induction machine winding; a main rectifier electrically connected to the first induction machine winding; a diode electrically connecting the excitation bridge and the main rectifier, the diode being biased in reverse polarity during a short circuit; and a permanent magnet machine supplying AC power to a rectifier bridge, the rectifier bridge converting the AC power from the permanent magnet machine to deliver DC power to the excitation bridge, wherein a DC bus of the rectifier bridge does not collapse during a short circuit of the main rectifier.

In another aspect of the present invention, a power generation system comprises an induction machine; a first induction machine winding; a second induction machine winding; an excitation bridge electrically connected to the second induction machine winding; a main rectifier electrically connected to the first induction machine winding; a first diode electrically connecting the excitation bridge and the main rectifier, the diode being biased in reverse polarity during a short circuit, wherein a secondary bus is maintained during the short circuit; and a switch, the main rectifier supplying a short circuit current to a main DC bus when the switch is closed, and the main rectifier supplying current to the excitation bridge when the switch is open.

In yet another aspect of the present invention, a power generation system comprises an induction machine; an induction machine winding; a combined excitation and rectification bridge; a secondary bus that remains charged during a short circuit condition; and a switch, the switch supplies a short circuit current to a main DC bus when closed, and the switch maintaining the secondary bus at a desired voltage when open.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides an electric power generation system employing a solid state electronically controlled induction machine (IM) capable of self-start motoring, power generation, and distribution-system compatibility for fault interruption. The short circuit compliant power generation system of the present invention may have an internal bus that does not collapse when the main DC bus is shorted.

Conventional electric power generation systems employing a solid state electronically controlled IM may be capable of self-start motoring and power generation, but, when the DC bus voltage may collapse upon a failure, an additional external source of DC voltage is not available for IM excitation. The present invention may provide an internal bus that does not collapse when the main DC bus is shorted. This internal or auxiliary bus may be used to excite the IM to provide generation function. The power generation systems of the present invention may play a significant role in the modern aerospace and military industries. This may be particularly true in the area of more electric architecture for aircraft and spacecraft.

Figure 1:
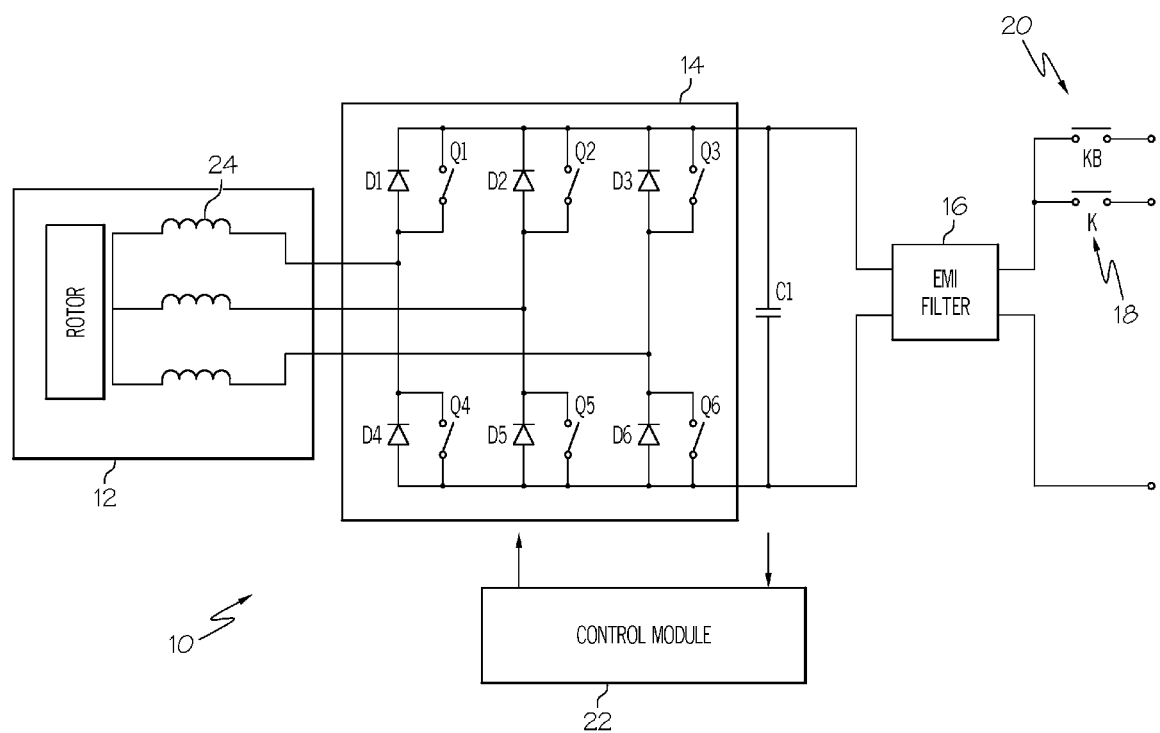
FIG. 1 is a schematic drawing showing a conventional simplified architecture of a power generation system using induction machines.
Figure 2:
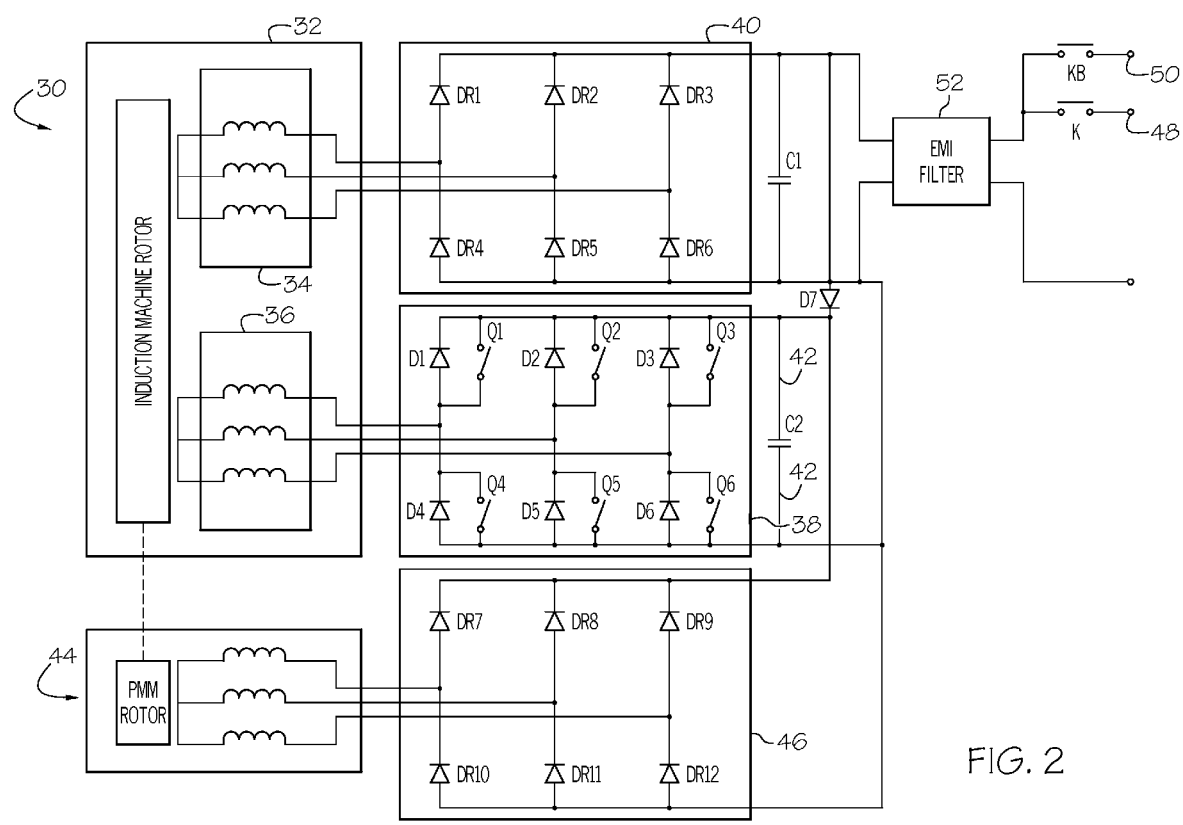
FIG. 2 is a schematic drawing showing a power generation system according to the present invention using an IM with two windings.

Referring to FIG. 2, there is shown a schematic drawing of a power generation system 30 according to the present invention using an IM 32 with a first winding 36 and a second winding 34. The first winding 36 may be used for excitation purposes and the second winding 34 may be used for power generation only. An excitation bridge (inverter) 38 (D1 through D6 representing six diodes, and Q1 through Q6 representing six switches) may provide excitation to the IM 32 during generating operation. The excitation inverter 38 may also provide, as described below, excitation during motoring (starting) mode and during short circuit. A main rectifier bridge 40, which may be comprised of six diodes DR1 through DR6, may operate during generation and short circuit only. A main bus capacitor C1 may provide smoothing function to the rectified voltage. The main bus capacitor C1 may be shorted during DC bus failure. However, the short circuit at this point may not extend to the remaining part of the power generation system 30 or, more specifically, to a secondary bus 42 formed around capacitor C2. This short-circuit protection function may be facilitated by diode D7, which may be biased in reverse polarity during a short circuit. Consequently, diode D7 may protect the secondary bus 42 from shorting. In this failure condition, the power to the excitation inverter 38 may be supplied by a small PMM 44 installed on the same shaft (not shown) where the IM 32 is located. The rectifier bridge 46 (DR7 through DR12) may convert the AC power from the PMM 44 to DC power. During normal operation, the PMM 44 and PMM rectifier bridge 46 may be idle. Therefore their sizing can be based on a very short period of operation.

The startup and motoring operations may be performed by using the excitation bridge 38, which may receive power from a main bus 48 or a battery bus 50 through an EMI filter 52 and diode D7. The capacitors C1 and C2 may operate in parallel during normal generating operation, which may provide additional cost and weight savings.

The above described power generation system 30 is fully compliant with the functional requirements (self-start motoring, power generation, and distribution-system compatibility for fault interruption) of a power generation system. The power generation system 30 may present improved efficiency during power generation since there are only diode conduction losses in the main rectifier 40. The excitation current may be much smaller than conventional power generation systems. Therefore, the system efficiency may be considered better compared to conventional power generation systems.

Figure 3:
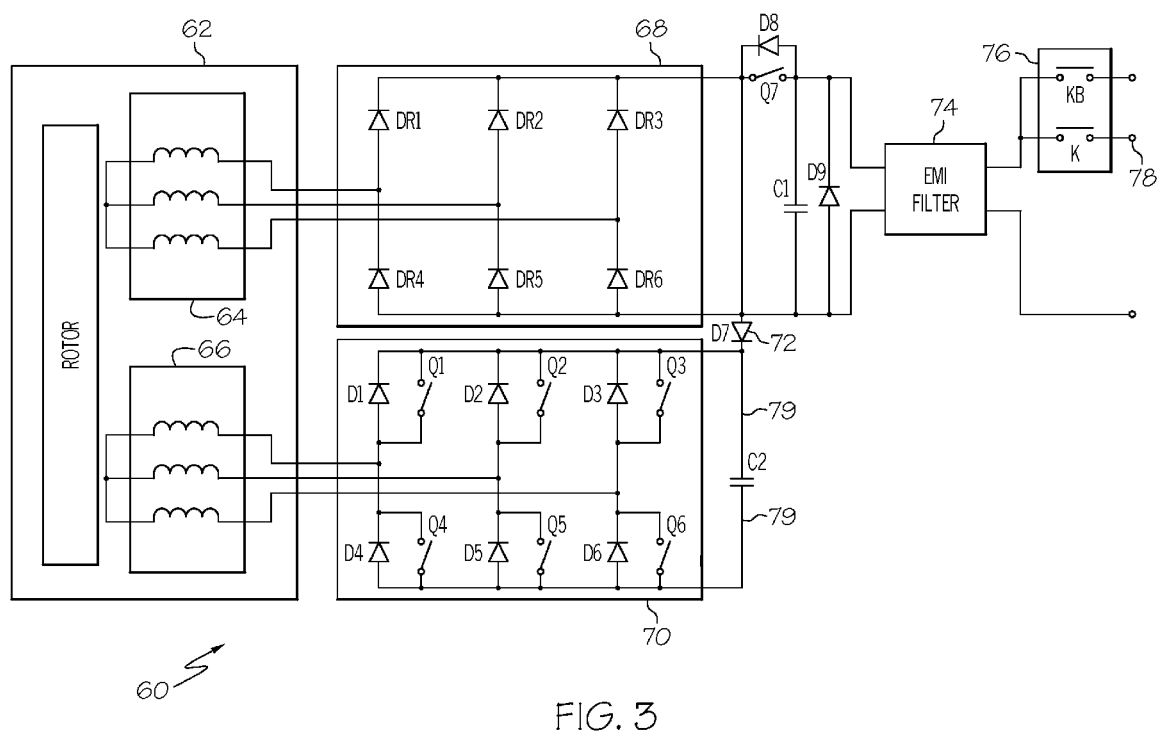
FIG. 3 is a schematic drawing showing a power generation system according to another embodiment of the present invention using two IM windings.

Referring to FIG. 3, there is shown a schematic drawing of a power generation system 60 according to another embodiment of the present invention using an IM 62 with a first IM winding 64 and a second IM winding 66. However, in this embodiment of the present invention, the PMM 44 and the PMM rectifiers 46 of the embodiment of FIG. 2 may be eliminated. This may result in reduced system complexity and improved reliability.

The function of the main rectifier 68, excitation bridge 70, bus isolation diode 72, EMI filter 74, bus capacitors C1 and C2 and the contactors 76 is the same as in the embodiment described above with reference to FIG. 2.

The operation of the topology of FIG. 3 is based on the bus-shearing function performed by the newly implemented switch Q7. Upon a short circuit at the main DC bus 78, Q7 may start high-frequency modulation to support the short circuit and, at the same time, to allow for maintaining the required DC voltage on a secondary DC bus 79 across C2. When Q7 is closed, the main rectifier 68 may supply a short circuit to the main DC bus 78. When Q7 is open, the main rectifier 68 may be charging the capacitor C2 and supplying the excitation bridge 70. The function of diode D9 may be to recover the inductive current flowing through the main DC bus 78 when Q7 is open. Diode D8 bypasses Q7 during self-start and motoring operation.

The topology of the power generation system 60 may present reduced complexity and improved reliability as compared conventional power generation systems.

Figure 4:
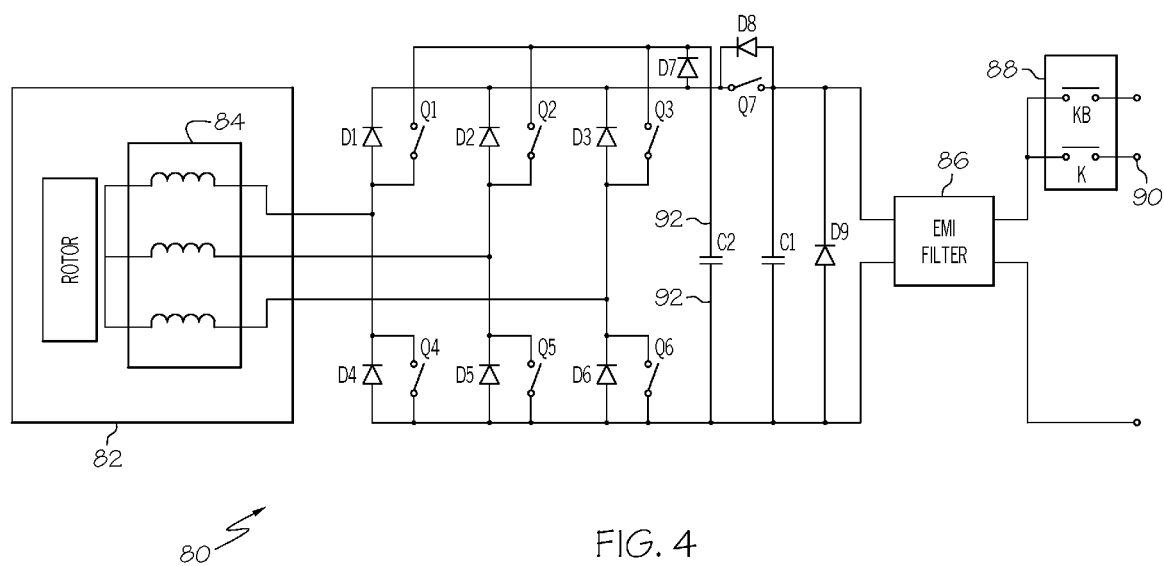
FIG. 4 is a schematic drawing showing a power generation system according to another embodiment of the present invention using only one IM winding.

Referring now to FIG. 4, there is shown a schematic drawing of a power generation system 80 according to another embodiment of the present invention using an IM 82 with only one IM winding 84. The excitation bridge 68 and the main rectifier bridge 70 of the embodiment of FIG. 3 may be combined in the present embodiment of the invention as shown in FIG. 4, thereby reducing the total number of components and interfaces. The function of the bus isolation diode D7, switch bypass diode D8, EMI filter 86, bus capacitors C1 and C2 and the contactors 88 is the same as in the embodiment of FIG. 3.

During motoring and self-start modes of operation, the power generation system 80 may operate very similarly to conventional systems. A main difference between conventional systems and the power generation system 80 may lie in the additional losses in the bypassing diode D8 and the isolation diode D7. The switch Q7 may be open and may not affect efficiency. During these modes of operation, both capacitors C1 and C2 may participate, resulting in reduced voltage and current ripples.

During power generation, the power generation system 80 may operate similarly to conventional systems, except that switch Q7 may be on and may conduct the entire current. Additional conduction losses in switch Q7 may be created.

Upon a short circuit of the main DC bus 90, the voltage across capacitor C1 may collapse and remain close to zero. Diode D7 may protect the secondary DC bus 92 from shorting and capacitor C2 may remain fully charged to the nominal voltage. At this moment, switch Q7 may start high-frequency modulation to support the short circuit and, at the same time, to allow for maintaining the required DC voltage on the secondary DC bus 92 across capacitor C2. When switch Q7 is closed, short circuit current to the main bus 90 may be supplied. When switch Q7 is open, the capacitor C2 may be charged via diode D7 and maintained at the desired voltage. The function of diode D9 is to recover the inductive current flowing in the main DC bus 90 when switch Q7 is open.

Figure 5:
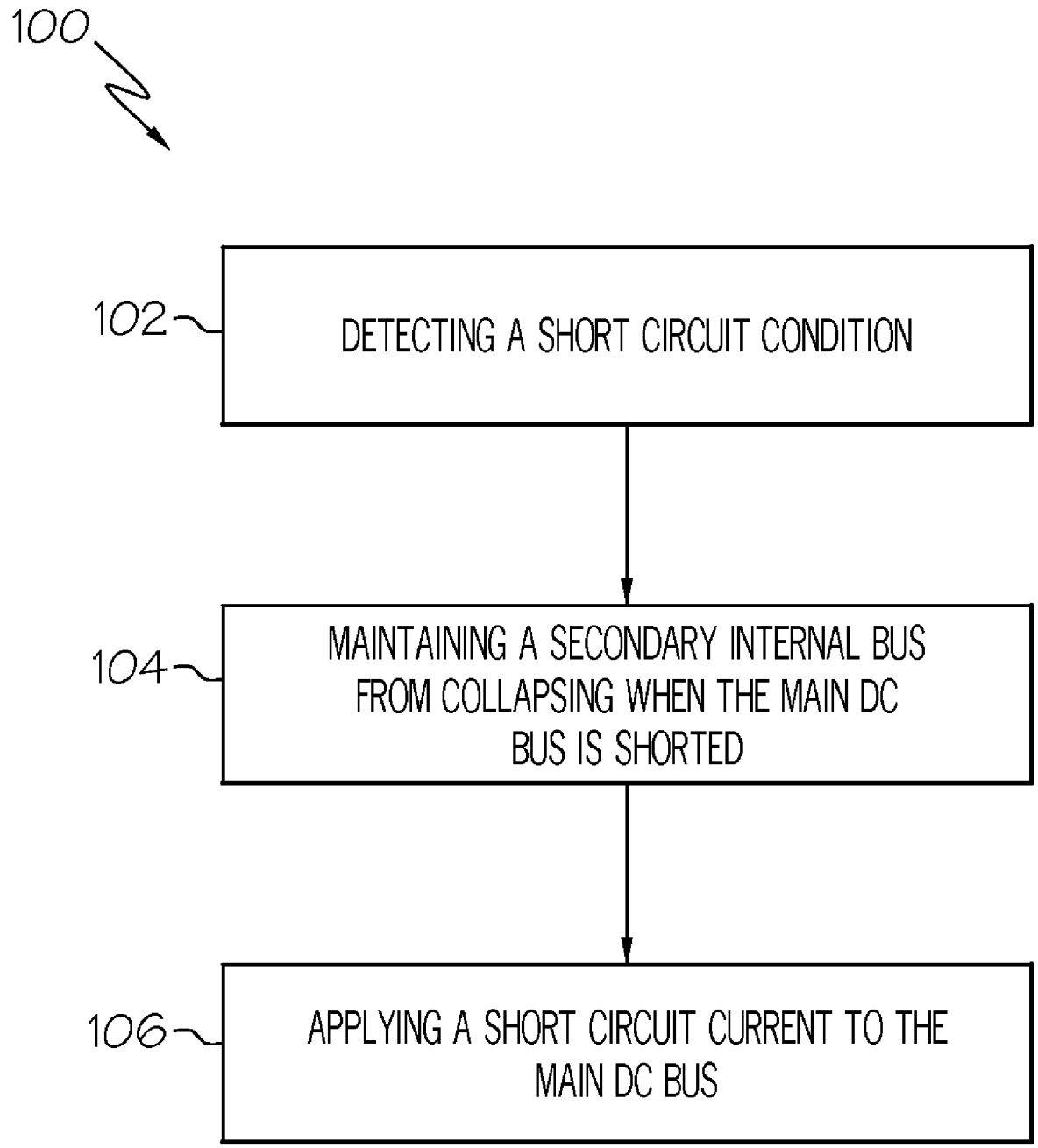
FIG. 5 is a flow chart describing a method according to another embodiment of the present invention.

Referring to FIG. 5, there is shown a flow chart describing a method 100 according to an embodiment of the present invention. A method 100 of supplying current to a main DC bus of a power generation system during a short circuit may include a step 102 of detecting a short circuit condition. This may be determined by, for example, the discharge of a capacitor at a main DC bus. The method 100 may include a step 104 of maintaining a secondary internal bus from collapse when the main DC bus is shorted. This secondary internal bus may be created by any of the power generation systems 30, 60, 80 as described above with reference to FIGS. 2 through 4. A step 106 of supplying a short current to the main DC bus may be performed, as discussed above, for fault protection purposes.

The methods and apparatus for the DC bus short-circuit-compliant power generation system using IM presents the following advantages: a) improved overall system safety due to easy removal of the rotor flux compared to PMM-based systems; b) improved functionality to allow for DC short circuit operation (as compared to conventional IM-based power generation systems); c) increased rotor temperature operation up to 500° F. due to squirrel cage rotor design of the IM; and d) reduced machine cost due to use of low cost squirrel cage rotor design.

It should be understood, of course, that the foregoing relates to exemplary embodiments of the invention and that modifications may be made without departing from the spirit and scope of the invention as set forth in the following claims.

We claim:

1. A power generation system comprising:
an induction machine;
a first induction machine winding;
a second induction machine winding;
an excitation bridge electrically connected to the second induction machine winding;
a main rectifier electrically connected to the first induction machine winding;
a diode electrically connecting the excitation bridge and the main rectifier, the diode being biased in reverse polarity during a short circuit; and
a permanent magnet machine supplying AC power to a rectifier bridge, the rectifier bridge converting the AC power from the permanent magnet machine to deliver DC power to the excitation bridge, wherein a DC bus of the rectifier bridge does not collapse during a short circuit of the main rectifier.

2. The power generation system according to claim 1, further comprising a main bus capacitor smoothing rectified voltage of the main rectifier.

3. The power generation system according to claim 2, further comprising a secondary bus formed around a secondary bus capacitor.

4. The power generation system according to claim 1, further comprising an EMI filter providing filtering for radiated and conducted emission to meet electromagnetic compliance requirements.

5. The power generation system according to claim 1, wherein:
the main rectifier bridge operates during a generation mode and a short circuit mode of the power generation system;
the excitation bridge operates during a startup and motoring mode of the power generation system; and the permanent magnet machine supplies power to the excitation bridge during a short circuit condition.

6. The power generation system according to claim 3, wherein the main bus capacitor and the secondary bus capacitor operate in parallel during a generation mode.

7. A power generation system comprising:
an induction machine;
a first induction machine winding;
a second induction machine winding;
an excitation bridge electrically connected to the second induction machine winding;
a main rectifier electrically connected to the first induction machine winding;
a first diode electrically connecting the excitation bridge and the main rectifier, the diode being biased in reverse polarity during a short circuit, wherein a secondary bus is maintained during the short circuit; and
a switch, the main rectifier supplying a short circuit current to a main DC bus when the switch is closed, and the main rectifier supplying current to the excitation bridge when the switch is open.

8. The power generation system according to claim 7, further comprising a second diode to allow current to bypass the switch when the power generation system is in a starting and motoring mode.

9. The power generation system according to claim 7, further comprising:
a main bus capacitor smoothing rectified voltage of the main rectifier; and
a secondary bus formed around a secondary bus capacitor.

10. The power generation system according to claim 7, further comprising a third diode recovering inductive current flowing through a main DC bus when the switch is open.

11. The power generation system according to claim 7, further comprising an EMI filter providing filtering for radiated and conducted emission to meet electromagnetic compliance requirements.

12. The power generation system according to claim 7, wherein:

the main rectifier bridge operates during a generation mode and a short circuit mode of the power generation system; and
the excitation bridge operates during a startup, motoring and generating mode of the power generation system.

13. A power generation system comprising:
an induction machine;
an induction machine winding;
a combined excitation and rectification bridge;
a secondary bus that remains charged during a short circuit condition; and
a switch, the switch supplies a short circuit current to a main DC bus when closed, and the switch maintaining the secondary bus at a desired voltage when open.

14. The power generation system according to claim 13, further comprising a bus isolation diode being biased in reverse polarity during a short circuit to provide a short circuit current from the secondary bus to a main DC bus.

15. The power generation system according to claim 13, further comprising a secondary bus capacitor, the secondary bus capacitor being charged via the bus isolation diode when the switch is open.

16. The power generation system according to claim 13, further comprising a main bus capacitor smoothing voltage from the combined excitation and rectification bridge.

17. The power generation system according to claim 16, wherein the secondary bus capacitor and the main bus capacitor may act together to reduce voltage and current ripples during a motoring and starting mode of the power generation system.

18. The power generation system according to claim 13, further comprising a diode recovering the inductive current flowing in the main DC bus when the switch is open.

19. The power generation system according to claim 13, further comprising an EMI filter providing filtering for radiated and conducted emission to meet electromagnetic compliance requirements.

20. The power generation system according to claim 13, wherein a DC short circuit condition generates a DC short circuit current to clear a fault protection circuit.

* * * * *